(12) United States Patent
Philbrick et al.

(10) Patent No.: US 10,344,614 B2
(45) Date of Patent: Jul. 9, 2019

(54) ACTIVE CLEARANCE CONTROL FOR A TURBINE AND CASE

(71) Applicant: United Technologies Corporation, Farmington, CT (US)

(72) Inventors: Graham R. Philbrick, Durham, CT (US); Patrick D. Couture, Tolland, CT (US); Jason Arnold, Rocky Hill, CT (US)

(73) Assignee: United Technologies Corporation, Farmington, CT (US)

(*) Notice: Subject to any disclaimer, the term of this patent is extended or adjusted under 35 U.S.C. 154(b) by 665 days.

(21) Appl. No.: 15/096,346

(22) Filed: Apr. 12, 2016

(65) Prior Publication Data

US 2017/0292399 A1 Oct. 12, 2017

(51) Int. Cl.

| | |
|---|---|
| F01D 17/14 | (2006.01) |
| F01D 25/24 | (2006.01) |
| F01D 5/02 | (2006.01) |
| B64D 27/10 | (2006.01) |
| F01D 11/24 | (2006.01) |
| G06F 19/00 | (2018.01) |

(52) U.S. Cl.
CPC ............ *F01D 17/145* (2013.01); *B64D 27/10* (2013.01); *F01D 5/02* (2013.01); *F01D 11/24* (2013.01); *F01D 25/24* (2013.01); *F05D 2220/323* (2013.01); *F05D 2270/114* (2013.01); *F05D 2270/20* (2013.01); *F05D 2270/303* (2013.01); *F05D 2270/304* (2013.01); *F05D 2270/305* (2013.01); *F05D 2270/309* (2013.01); *F05D 2270/335* (2013.01); *F05D 2270/44* (2013.01)

(58) Field of Classification Search
CPC .......... F01D 17/145; F01D 5/02; F01D 25/24; B64D 27/10; F05D 2220/323; F05D 2270/20; F05D 2270/303
USPC ................ 701/3, 13, 14, 16, 100, 29.1, 29.2
See application file for complete search history.

(56) References Cited

U.S. PATENT DOCUMENTS

| | | | |
|---|---|---|---|
| 4,019,320 A | 4/1977 | Redinger | |
| 4,069,662 A | 1/1978 | Redinger | |
| 5,005,352 A | 4/1991 | Schwarz | |
| 5,012,420 A * | 4/1991 | Walker | ............... F01D 11/24 |
| | | | 415/1 |

(Continued)

FOREIGN PATENT DOCUMENTS

EP 2942490 A1 11/2015

OTHER PUBLICATIONS

EP search report for EP17164849.6 dated Sep. 7, 2017.
(Continued)

*Primary Examiner* — Gertrude Arthur Jeanglaude
(74) *Attorney, Agent, or Firm* — O'Shea Gatz P.C.

(57) ABSTRACT

Aspects of the disclosure are directed to systems and methods for receiving operating state parameters associated with an operative state of an aircraft, determining a clearance value between a first structure of the engine and a second structure of the engine, where the clearance value is determined based on the operating state parameters and a passive clearance model that includes a specification of an uncertainty in the clearance value, determining that the clearance value deviates from a clearance target in an amount that is greater than a threshold, and engaging an active clearance control (ACC) mechanism based on the deviation.

19 Claims, 7 Drawing Sheets

(56) References Cited

U.S. PATENT DOCUMENTS

| | | |
|---|---|---|
| 5,090,193 A | 2/1992 | Schwarz |
| 5,152,666 A | 10/1992 | Stripinis |
| 5,392,614 A | 2/1995 | Coffinberry |
| 5,601,402 A * | 2/1997 | Wakeman ............... F01D 11/22 415/173.1 |
| 6,190,124 B1 | 2/2001 | Freling |
| 8,038,388 B2 | 10/2011 | Freling |
| 8,126,628 B2 | 2/2012 | Hershey |
| 8,944,756 B2 | 2/2015 | Lagueux |
| 2006/0140756 A1 | 6/2006 | Schwarz |
| 2012/0099992 A1 | 4/2012 | Stock |
| 2013/0017057 A1 | 1/2013 | Lagueux |
| 2013/0028705 A1 | 1/2013 | Lagueux |
| 2013/0152601 A1 | 6/2013 | Bacic |
| 2013/0177385 A1 | 7/2013 | Munsell |
| 2013/0177414 A1 | 7/2013 | Bonneau |
| 2013/0192238 A1 | 8/2013 | Munsell |
| 2013/0192248 A1 | 8/2013 | Ackermann |
| 2013/0192253 A1 | 8/2013 | Ackermann |
| 2013/0195627 A1 | 8/2013 | Glahn |
| 2013/0323010 A1 | 12/2013 | Mosley |
| 2014/0216004 A1 | 8/2014 | Munsell |
| 2014/0238042 A1 | 8/2014 | Munsell |
| 2014/0318143 A1 | 10/2014 | Glahn |
| 2015/0247417 A1 * | 9/2015 | Bacic ..................... F01D 11/20 415/1 |
| 2015/0285090 A1 | 10/2015 | Munsell |
| 2015/0300266 A1 | 10/2015 | Glahn |
| 2015/0308274 A1 | 10/2015 | Philbrick |

OTHER PUBLICATIONS

Scott B. Lattime, "Turbine Engine Clearance Control Systems: Current Practices and Future Directions", NASA/TM—2002-211794, AIAA-2002-3790, Sep. 2002.

Wesley K. Lord, "Flow Control Opportunities in Gas Turbine Engines", AIAA 2000-2234, Fluids 2000, Jun. 19-22, 2000.

Dennis Gulley, "More Intelligent Gas Turbine Engines", North Atlantic Treaty Organization, AC/323(AVT-128)TP/255, Published Apr. 2009.

NIST.gov, "Real-Time Tip-Clearance Active Control System", available from: <http://www.nist.gov/tip/wp/pswp/upload/259_real_time_tip_clearance_active_control_system.pdf> at least as of Feb. 18, 2016.

* cited by examiner

ACTIVE CLEARANCE CONTROL FOR A TURBINE AND CASE

BACKGROUND

Gas turbine engines, such as those which power aircraft and industrial equipment, employ a compressor section to compress air which is drawn into the engine and a turbine section to capture energy associated with the combustion of a fuel-air mixture which is exhausted from the engine's combustor section.

One or more cases are used to house the engine sections. For example, an engine case may house the turbine section. From the perspective of engine performance/efficiency, it is desirable to maintain as small a gap/clearance between the static engine case (stator) and the rotating turbine (rotor) blades as possible in order to maximize the energy that is captured by the turbine section as described above. However, a minimum clearance threshold must be maintained; otherwise, the turbine blades and the engine case may rub against one another so as to reduce the usable lifetime of the turbine blades or the engine case.

Active clearance control (ACC) algorithms are used to control the temperature of the engine case. For example, supplying cool air to the engine case causes the engine case to contract, thereby decreasing the clearance between the engine case and the turbine blades.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method comprising: receiving operating state parameters associated with an operative state of an aircraft, determining a clearance value between a first structure of the engine and a second structure of the engine, where the clearance value is determined based on the operating state parameters and a passive clearance model that includes a specification of an uncertainty in the clearance value, determining that the clearance value deviates from a clearance target in an amount that is greater than a threshold, and engaging an active clearance control (ACC) mechanism based on the deviation. In some embodiments, the first structure of the engine includes an engine case and the second structure of the engine includes a turbine section. In some embodiments, engaging the ACC mechanism includes controlling at least one valve. In some embodiments, controlling the at least one valve includes controlling an extent to which the at least one valve is open based on the deviation in order to control an amount of air that is provided to the engine case. In some embodiments, engaging the ACC mechanism includes at least one of activating the ACC mechanism, adjusting one or more outputs of the ACC mechanism based on one or more inputs, or deactivating the ACC mechanism. In some embodiments, the method comprises obtaining the passive clearance model and the clearance target, and storing the obtained passive clearance model and the clearance target in a memory. In some embodiments, the operating state parameters include at least one of a rotor speed or a spool speed that indicates that the engine is operating in climb power conditions. In some embodiments, the operating state parameters include a specification of at least one of: wind, turbulence, temperature, a bearing deflection, a vibratory deflection, a pilot command, an aircraft maneuver, rotor speed, spool speed, or thrust. In some embodiments, the clearance target is selected from a plurality of clearance targets included in a clearance target schedule, and the clearance target schedule is based on at least one performance metric associated with the aircraft.

Aspects of the disclosure are directed to a system comprising: a control computer that includes a processor configured to execute instructions to: receive operating state parameters associated with an operative state of an aircraft, determine a clearance value between a first structure of the engine and a second structure of the engine, where the clearance value is determined based on the operating state parameters and a passive clearance model that includes a specification of an uncertainty in the clearance value, determine that the clearance value deviates from a clearance target in an amount that is greater than a threshold, and engage an active clearance control (ACC) mechanism based on the deviation. In some embodiments, the system comprises the ACC mechanism. In some embodiments, the ACC mechanism includes: at least one valve coupled to the control computer, the at least one valve configured to respond to commands issued by the control computer, and at least one pipe coupled to the at least one valve and the first structure of the engine. In some embodiments, the first structure of the engine includes an engine case and the second structure of the engine includes a turbine section. In some embodiments, the at least one valve is configured to receive air from a source, and when the at least one valve is at least partially open the at least one valve is configured to provide the air from the source to the at least one pipe. In some embodiments, the control computer includes at least one of a memory or a non-transitory computer-readable medium, and the passive clearance model and the clearance target are stored in the at least one of a memory or a non-transitory computer-readable medium. In some embodiments, the operating state parameters include at least one of a rotor speed or a spool speed that indicates that the engine is operating in climb power conditions. In some embodiments, the climb power conditions are associated with the at least one of a rotor speed or a spool speed being greater than a second threshold. In some embodiments, the clearance target is included as part of a plurality of clearance targets over the climb power conditions, and values of the clearance targets increase as the at least one of a rotor speed or a spool speed increases. In some embodiments, the values of the clearance targets increase linearly or parabolically as the at least one of a rotor speed or a spool speed increases.

BRIEF DESCRIPTION OF THE DRAWINGS

The present disclosure is illustrated by way of example and not limited in the accompanying figures in which like reference numerals indicate similar elements. The figures are not necessarily drawn to scale unless specifically indicated otherwise.

DETAILED DESCRIPTION

Figure 1:
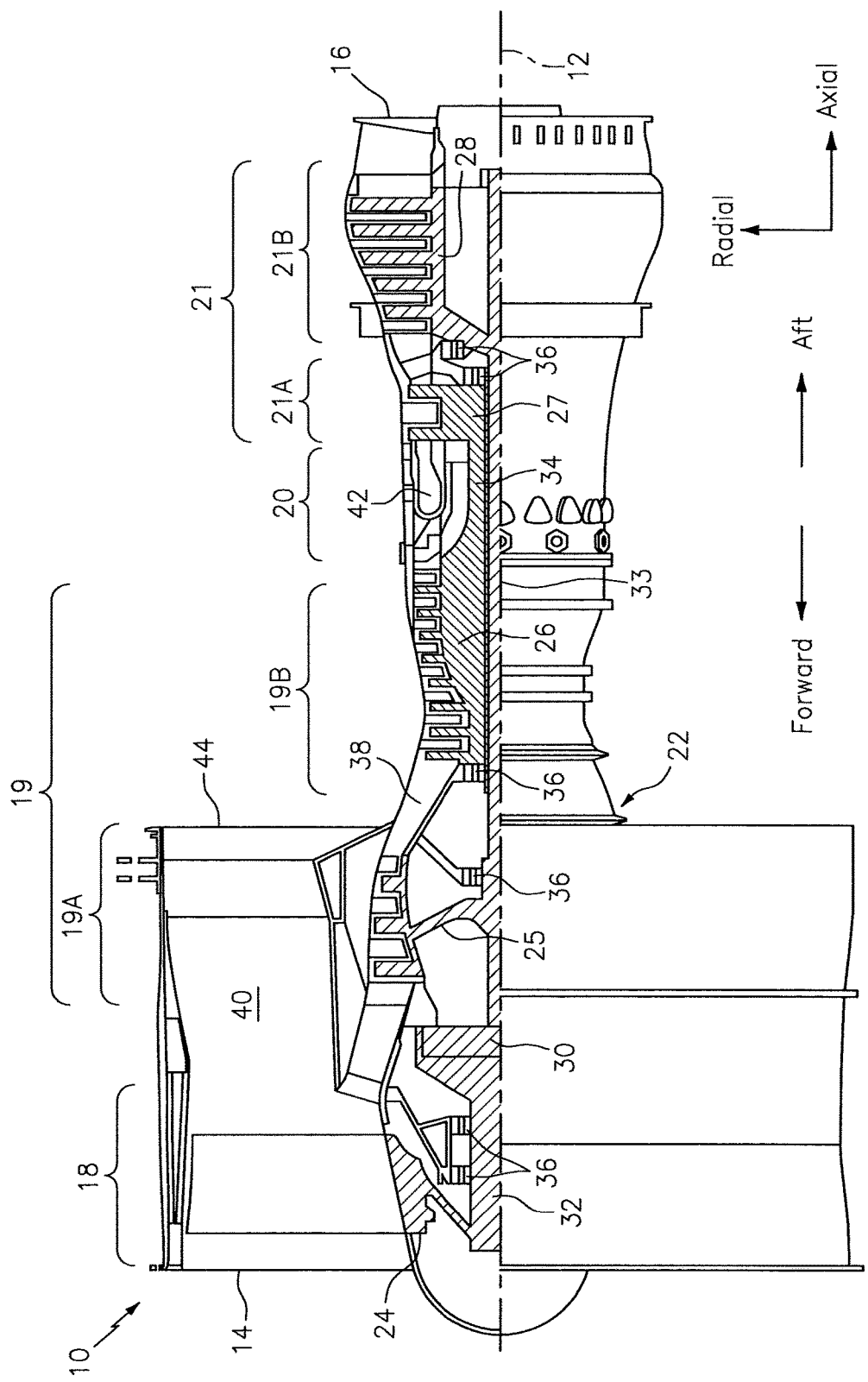
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems, and methods are described for maintaining a target clearance between two or more entities, such as for example a turbine section of an engine and an engine case. The target clearance may be adjusted/selected based on one or more parameters, such as for example a variability/uncertainty in one or more of the parameters. In this manner, engine component lifetime may be increased/maximized while still providing for efficient engine performance.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for a geared engine 10. Aspects of the disclosure may be applied in connection with other environments, including additional configurations for gas turbine engines.

Figure 3:
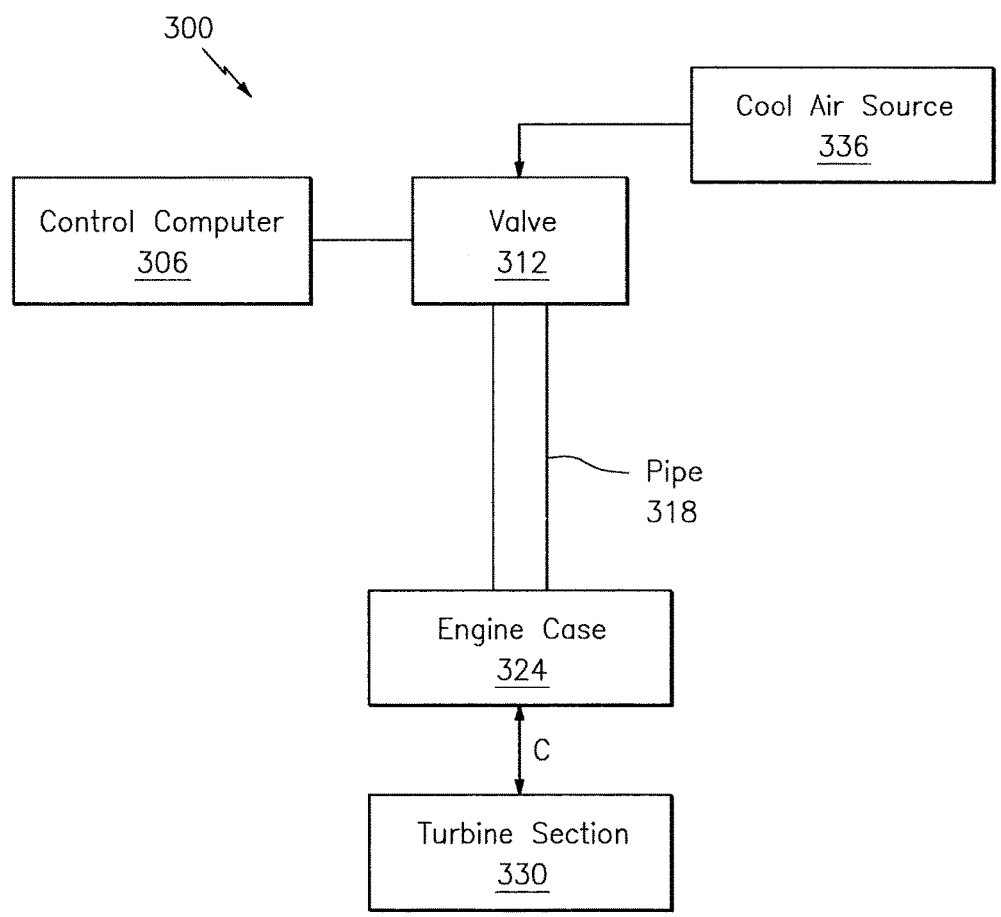
FIG. 3 illustrates a block diagram of a system for implementing one or more active clearance control (ACC) algorithms in accordance with an embodiment.

Referring now to FIG. 3, a block diagram of a system 300 is shown. The system 300 may include a control computer 306, one or more valves 312, one or more pipes 318, an engine case 324, a turbine section 330 (which may correspond to the turbine section 21 of FIG. 1), and a cool air source 336. The system 300 may control a position of the engine case 324 relative to a position of the turbine section 330 to maintain a target clearance 'C' between the engine case 324 and the turbine section 330. The control computer 306 may comprise a single processor or one or more components in direct communication or distributed in multiple locations and configured to communicate with one another.

The control computer 306 may issue one or more commands to the valve 312. The commands may control whether a valve 312 is open or closed, or the degree/extent to which the value 312 is opened or closed. When the valve 312 is closed the valve 312 might not provide cool air from the cool air source 336 to the engine case 324 via the pipe 318. Conversely, when the valve 312 is open the valve 312 may provide cool air from the cool air source 336 to the engine case 324 via the pipe 318. The providing of the cool air to the engine case 324 may cause the engine case 324 to contract, thereby reducing the clearance 'C' between the engine case 324 and the turbine section 330.

Figure 4:
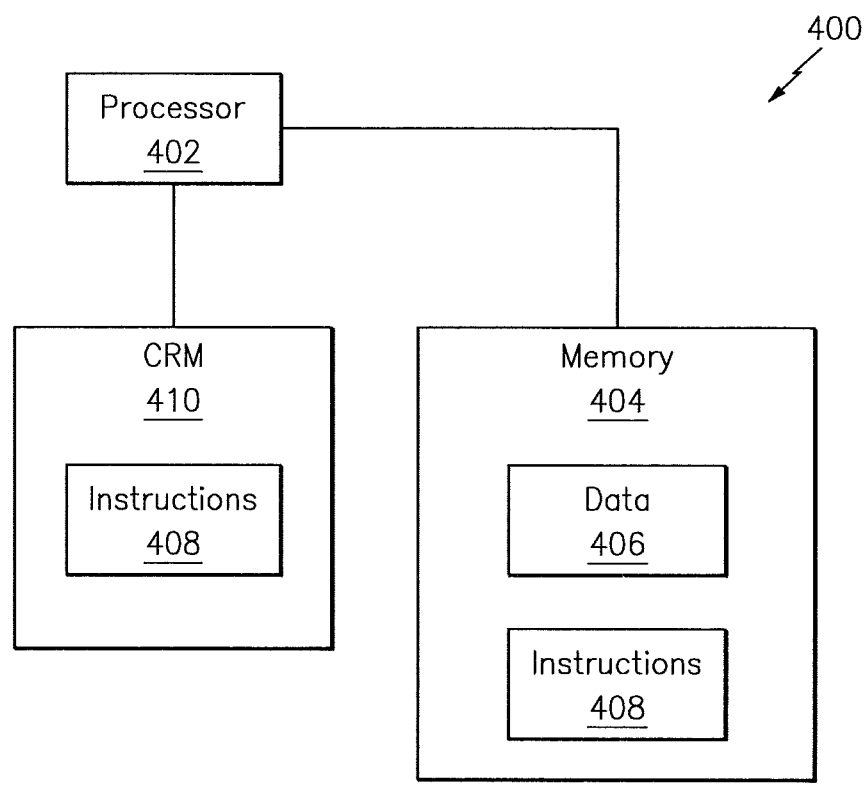
FIG. 4 illustrates a block diagram of a computing system in accordance with an embodiment.

Referring to FIG. 4, a computing system 400 is shown. The system 400 may be associated with one or more computers and/or one or more controllers (e.g., the control computer 306). The system 400 may include one or more processors (generally shown by a processor 402) and a memory 404. The memory 404 may store data 406 and/or instructions 408. The system 400 may include a computer-readable medium (CRM) 410 that may store some or all of the instructions 408. The CRM 410 may include a transitory and/or a non-transitory computer-readable medium.

The instructions 408, when executed by the processor 402, may cause the system 400 (or one or more portions thereof) to perform one or more methodological acts or processes, such as those described herein.

The data 406 may include data obtained from one or more detectors, may include results of processing the data obtained from the detectors, etc. In some embodiments, the data 406 may be associated with one or more programs or algorithms, such as for example an active clearance control (ACC) algorithm as described below. The data 406 may be used to maintain a target clearance between two or more structures (e.g., an engine case and a turbine section) as described herein.

Figure 2A:
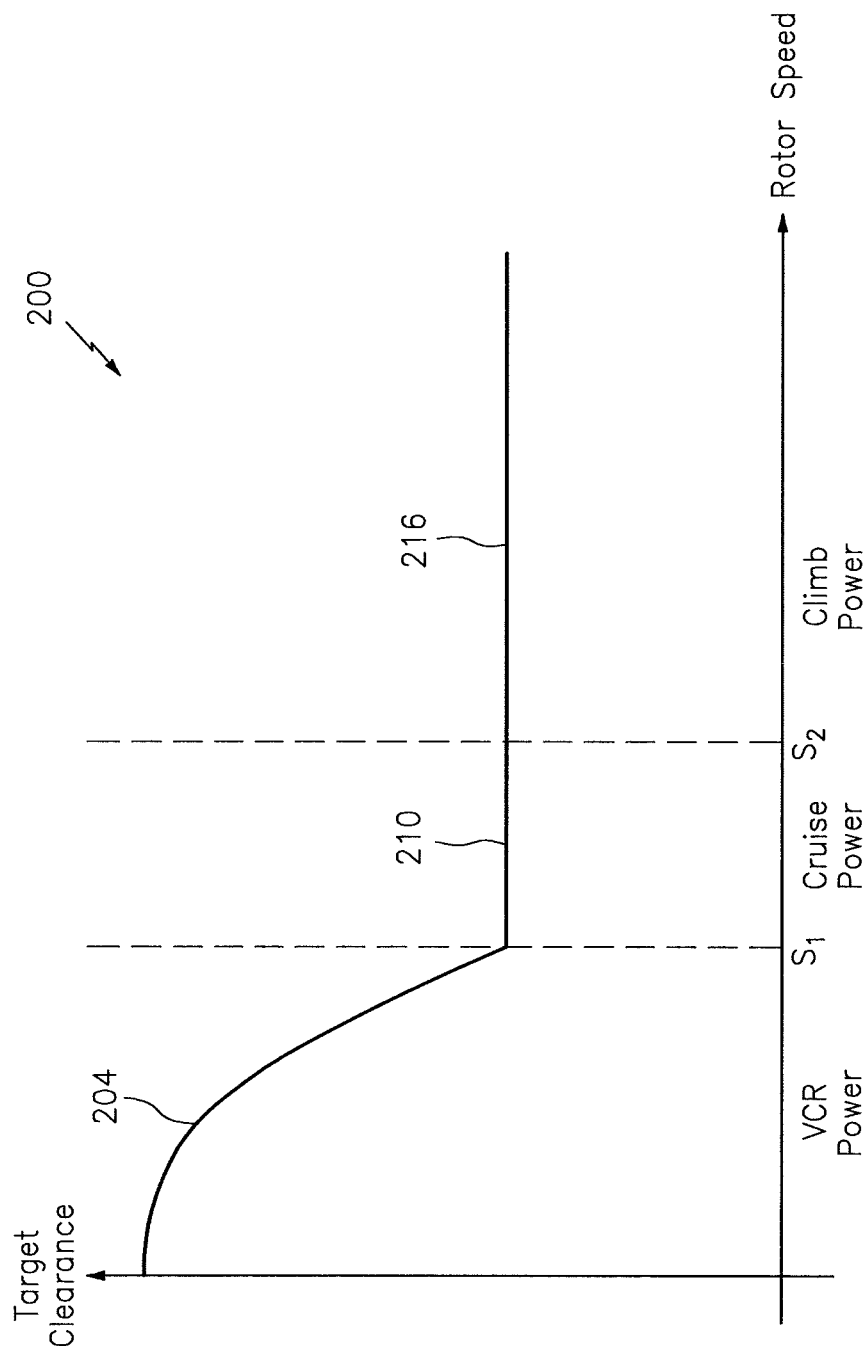
FIG. 2A illustrates a graph of a target clearance between a turbine section and an engine case as a function of rotor speed.
Figure 2B:
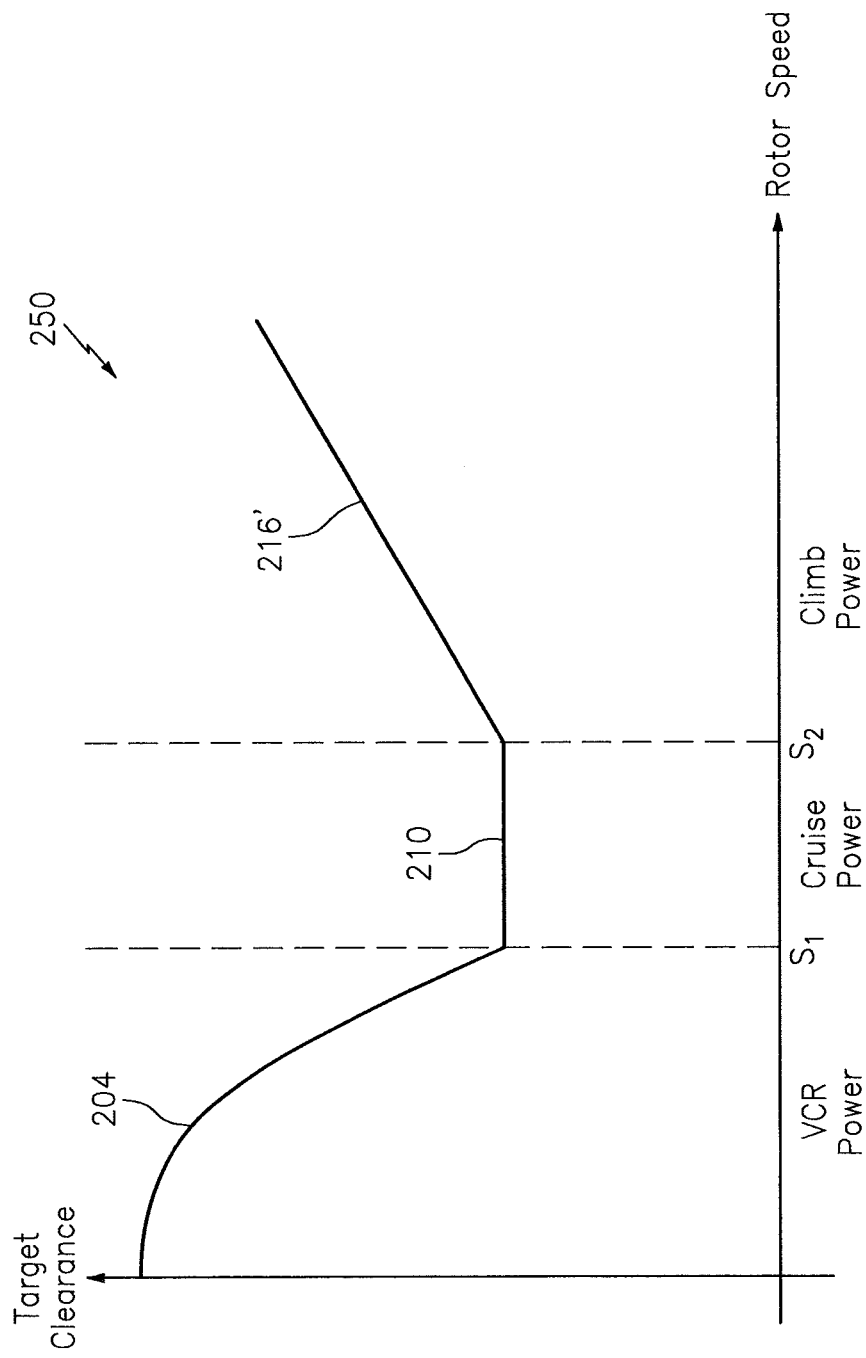
FIG. 2B illustrates a graph of a target clearance between a turbine section and an engine case as a function of rotor speed in accordance with an embodiment.

Referring now to FIG. 2B and FIG. 3, a qualitative graph 250 of a target clearance between the turbine section 330 and the engine case 324 on the vertical axis versus rotor speed on the horizontal axis is shown. The profile of the target clearance in the graph 250 over the variable cruise ramp (VCR) power conditions and the cruise power conditions (which power conditions are defined/shown about a threshold $s_1$) may be substantially similar to the graph 200 of FIG. 2A, as reflected by the inclusion of the segments 204 and 210 in FIG. 2B. However, during/in climb power conditions when the rotor speed (or analogously, spool speed) is above the threshold $s_2$ the target clearance may assume values represented by a segment 216'. The segment 216' is illustratively shown as a line/linear function. Other values/shapes for the segment 216' may be used, including for example a parabolic profile.

Figure 2C:
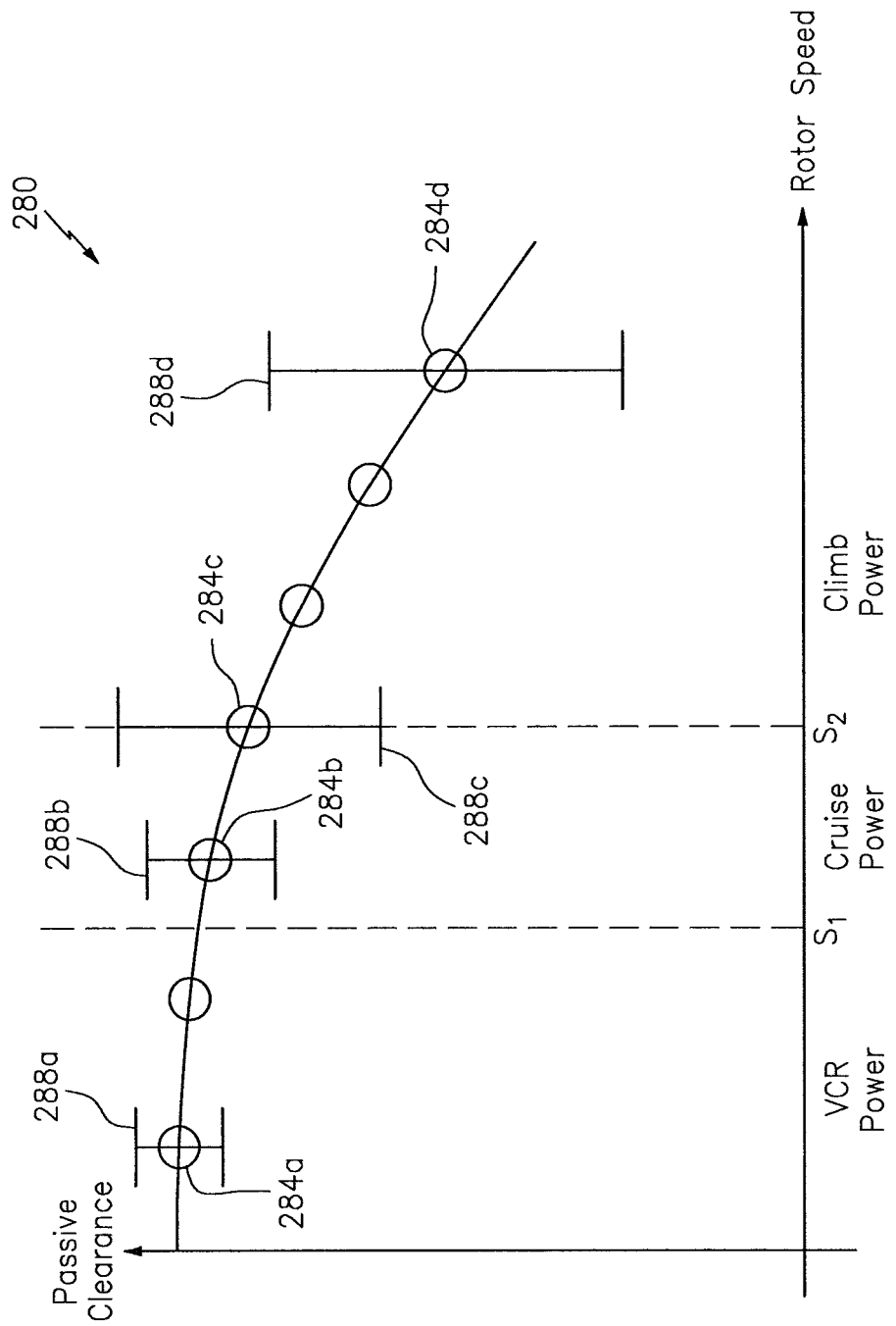
FIG. 2C illustrates a graph of passive clearance values as a function of rotor speed in accordance with an embodiment.

The difference between the segment 216 of FIG. 2A and the segment 216' of FIG. 2B may be represented graphically as shown in FIG. 2C. In particular, FIG. 2C illustrates a graph 280 of a passive clearance on the vertical axis as a function of rotor speed (or analogously, spool speed) on the horizontal axis. As used herein, a passive clearance relates to the clearance that would be obtained between two structures (e.g., the clearance between the engine case 324 and the turbine section 330) in the absence of any active clearance control mechanisms (e.g., in the absence of the supply of cool air to the engine case 324 via the valve 312 and pipe 318).

For purposes of facilitating this description, a number of discrete points/values on the graph 280 are denoted via (heavy) circles, such as for example the points 284a, 284b, 284c, and 284d. Superimposed with each of the points 284a-284d is a set of variability/uncertainty bars 288a-288d, respectively. As one of skill in the art would appreciate, the vertical span of each of the uncertainty bars 288a-288d (e.g., uncertainty bar 288a) represents the range of the value of the passive clearance at the respective point (e.g., point 284a).

As reflected in the graph 280, the vertical span of the uncertainty bars 288a-288d increases as the rotor speed increases. For example, the uncertainty 288a in the value of the passive clearance at the point 284a is substantially less than the uncertainty 288d in the value of the passive clearance at the point 284d. Uncertainty may grow/increase as a function of how the engine is operated. Much of this uncertainty may be driven by the aircraft operation as well. During climb, aircraft maneuvers can be expected, turbulent air may be encountered, go-arounds or other holding patterns can be requested by flight control, etc. One or more of these factors may impact the maneuver/vibratory deflections being inducted on the engine. One or more of these factors may also be coupled with more rapid throttle transients from the cockpit and less predictable auto-throttle operation (e.g., may use a high gain protective mode). In general, when the engine is at climb power there may be more variation in the aircraft operation.

The uncertainties in the values of the passive clearance at rotor speed values greater than (or equal to) the speed threshold $s_2$ may be sufficiently large (e.g., larger than a threshold amount) to warrant a greater value for the target clearance as represented by the segment 216' of FIG. 2B (relative to the segment 210). In this respect, an ACC algorithm (e.g., FIG. 5) or structure (e.g., FIG. 3) may be engaged to provide for the increase in the target clearance.

Figure 5:
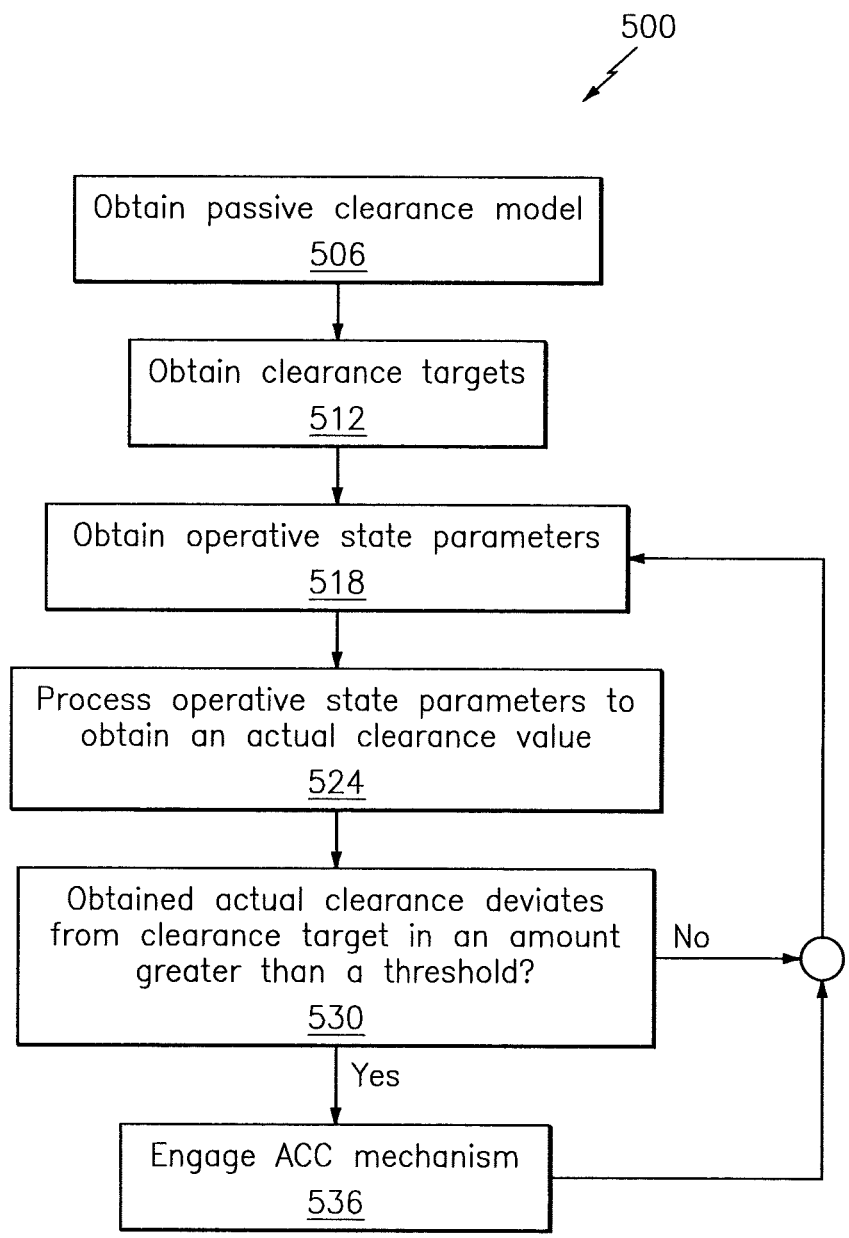
FIG. 5 illustrates a flowchart of an exemplary method for obtaining a clearance between two or more structure of an engine in accordance with an embodiment.

FIG. 5 illustrates a flowchart of an exemplary method 500 for determining a target clearance in accordance with an ACC algorithm. The method 500 may be executed in conjunction with the system 300, or may be modified to execute in conjunction with any other system as would be appreciated by one of skill in the art.

In block 506, a passive clearance model may be based on one or more parameters, such as for example wind, turbulence, temperature (e.g., ambient temperature), bearing deflections, vibratory deflections, pilot commands/control inputs, aircraft maneuvers, speed (e.g., rotor speed or spool speed), thrust, etc. The passive clearance model may also include a specification of uncertainty in the passive clearance similar to what is shown and described above in connection with the graph 280 of FIG. 2C. One or more speed (e.g., rotor speed or spool speed) thresholds may be specified as part of the passive clearance model.

In block 512, clearance targets for the two or more structures may be determined. The clearance targets may be determined using either a look up table or calculated either in real time, or prior to their use and stored in memory or other storage location and accessible to a computer processor as is known in the art. The clearance targets, which may be included as part of a clearance target schedule, may be based one or more performance metrics/targets; the performance targets may be based on the application/program. The clearance targets may be based on one or more parameters such as speed, air temperature, or such other parameters or values capable of being used to define the clearance targets that adhere to, e.g., the graph 250 of FIG. 2B. One or more speed (e.g., rotor speed or spool speed) thresholds may be specified as part of the clearance targets.

In block 518, parameters associated with the operative state of an aircraft may be obtained or received. For example, as the aircraft is being operated information associated with wind, turbulence, temperature (e.g., ambient temperature), bearing deflections, vibratory deflections, pilot commands/control inputs, aircraft maneuvers, speed (e.g., rotor speed or spool speed, air speed), thrust, etc., may be obtained or received as part of block 518.

The parameters obtained or received in block 518 may be representative of real-time data or may be subjected to one or more processing (e.g., filtering) algorithms. For example, in block 524 the parameters of block 518 may be processed to obtain a value for an actual clearance. The value for the actual clearance may be based on the passive clearance model of block 506. In this respect, the actual clearance may include a specification of uncertainty in the actual clearance that is derived from the passive clearance model.

In block 530, a determination may be made whether the actual clearance value that is obtained as part of block 524 deviates from a clearance target specified in block 512 in an amount that is greater than a threshold. If the deviation determined in block 530 is less than (or equal to) the threshold flow may proceed from block 530 to block 518. Otherwise, if the deviation is greater than the threshold flow may proceed from block 530 to block 536.

In block 536, one or more ACC mechanisms may be engaged in order to decrease the extent of the deviation between the actual clearance and the clearance target determined in block 530. For example, the state of one or more valves (e.g. the valve 312) may be controlled (e.g., modulated) to control an amount of cool air provided to an engine case (e.g., the engine case 324). The extent to which the valve(s) is/are open may be based on the degree of deviation determined in block 530. To the extent that an ACC mechanism was already engaged prior to entry into block 536, block 536 may also include updating the state/condition of that ACC mechanism. In this respect, engaging an ACC mechanism refers to activating an ACC mechanism, adjusting/modifying one or more outputs of the ACC mechanism based on one or more inputs, or deactivating the ACC mechanism.

In some embodiments, the passive clearance model of block 506 or the clearance targets of block 512 may be incorporated (e.g., stored) as part of the data 406 and/or the instructions 408 of the system 400. In this respect, the passive clearance model of block 506 or the clearance targets of block 512 may be pre-loaded into the system 400 (or the system 300) as part of a design or manufacture of an aircraft, as part of a maintenance activity associated with the aircraft, etc. Conversely, the blocks 518-536 may be associated with the operation of the aircraft (or an associated engine).

Technical effects and benefits of this disclosure include enhanced protection of structures of an aircraft engine during various speed/power conditions. Aspects of the disclosure may be used to ensure that a minimum clearance between an engine case and a turbine section of the engine is maintained over the operative envelope of the engine to enhance the useable lifetime of the engine case and the turbine section while at the same time ensuring that the clearance does not exceed a maximum value so as to promote engine performance/efficiency. The actual clearance may be adjusted based on an engagement of one or more ACC mechanisms. The actual clearance that is obtained may be based on uncertainties in a passive clearance model.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method comprising:
   receiving, by a control computer, operating state parameters associated with an operative state of an aircraft;
   determining, by the control computer, a clearance value associated with a clearance between a first structure of an engine and a second structure of the engine, wherein the clearance value is determined based on the operating state parameters and a passive clearance model that includes a specification of an uncertainty in the clearance value;
   determining, by the control computer, that the clearance value deviates from a clearance target associated with the clearance in an amount that is greater than a threshold; and
   engaging, by the control computer, an active clearance control (ACC) mechanism based on the deviation,
   wherein the passive clearance model is based on a passive clearance that would be obtained between the first structure and the second structure in the absence of the ACC mechanism,
   wherein the operating state parameters include at least one of a rotor speed or a spool speed, and
   wherein the uncertainty specified in the passive clearance model increases as the at least one of a rotor speed or a spool speed increases.

2. The method of claim 1, wherein the first structure of the engine includes an engine case and the second structure of the engine includes a turbine section.

3. The method of claim 2, wherein engaging the ACC mechanism includes controlling at least one valve.

4. The method of claim 3, wherein controlling the at least one valve includes controlling an extent to which the at least one valve is open based on the deviation in order to control an amount of air that is provided to the engine case.

5. The method of claim 1, wherein engaging the ACC mechanism includes at least one of activating the ACC mechanism, adjusting one or more outputs of the ACC mechanism based on one or more inputs, or deactivating the ACC mechanism.

6. The method of claim 1, further comprising:
   obtaining the passive clearance model and the clearance target; and
   storing the obtained passive clearance model and the clearance target in a memory.

7. The method of claim 1, wherein the at least one of a rotor speed or a spool speed indicates that the engine is operating in climb power conditions.

8. The method of claim 1, wherein the operating state parameters include a specification of at least one of: wind, turbulence, temperature, a bearing deflection, a vibratory deflection, a pilot command, an aircraft maneuver, or thrust.

9. The method of claim 1, wherein the clearance target is selected from a plurality of clearance targets included in a clearance target schedule, and wherein the clearance target schedule is based on at least one performance metric associated with the aircraft.

10. A system comprising:
    a control computer that includes a processor configured to execute instructions to:
       receive operating state parameters associated with an operative state of an aircraft;
       determine a clearance value associated with a clearance between a first structure of an engine and a second structure of the engine, wherein the clearance value is determined based on the operating state parameters and a passive clearance model that includes a specification of an uncertainty in the clearance value;
       determine that the clearance value deviates from a clearance target associated with the clearance in an amount that is greater than a threshold; and
       engage an active clearance control (ACC) mechanism based on the deviation,
    wherein the passive clearance model is based on a passive clearance that would be obtained between the first structure and the second structure in the absence of the ACC mechanism,
    wherein the operating state parameters include at least one of a rotor speed or a spool speed, and
    wherein the uncertainty specified in the passive clearance model increases as the at least one of a rotor speed or a spool speed increases.

11. The system of claim 10, further comprising:
    the ACC mechanism.

12. The system of claim 11, wherein the ACC mechanism includes:
    at least one valve coupled to the control computer, the at least one valve configured to respond to commands issued by the control computer; and
    at least one pipe coupled to the at least one valve and the first structure of the engine.

13. The system of claim 12, wherein the first structure of the engine includes an engine case and the second structure of the engine includes a turbine section.

14. The system of claim 12, wherein the at least one valve is configured to receive air from a source, and wherein when the at least one valve is at least partially open the at least one valve is configured to provide the air from the source to the at least one pipe.

15. The system of claim 10, wherein the control computer includes at least one of a memory or a non-transitory computer-readable medium, and wherein the passive clearance model and the clearance target are stored in the at least one of a memory or a non-transitory computer-readable medium.

16. The system of claim 10, wherein the at least one of a rotor speed or a spool speed indicates that the engine is operating in climb power conditions.

17. The system of claim 16, wherein the climb power conditions are associated with the at least one of a rotor speed or a spool speed being greater than a second threshold.

18. The system of claim 16, wherein the clearance target is included as part of a plurality of clearance targets over the climb power conditions, and wherein values of the clearance targets increase as the at least one of a rotor speed or a spool speed increases.

19. The system of claim 18, wherein the values of the clearance targets increase linearly or parabolically as the at least one of a rotor speed or a spool speed increases.

* * * * *